United States Patent [19]

Credelle et al.

[11] Patent Number: 4,630,893
[45] Date of Patent: Dec. 23, 1986

[54] LCD PIXEL INCORPORATING SEGMENTED BACK-TO-BACK DIODE

[75] Inventors: Thomas L. Credelle, Lawrenceville; Arthur H. Firester, Skillman, both of N.J.

[73] Assignee: RCA Corporation, Princeton, N.J.

[21] Appl. No.: 728,660

[22] Filed: Apr. 29, 1985

[51] Int. Cl.⁴ .............................................. G02F 1/13
[52] U.S. Cl. ..................................................... 350/334
[58] Field of Search ................................ 350/333, 334

[56] References Cited

U.S. PATENT DOCUMENTS 4,523,189  6/1985  Takahara et al. ................... 340/781
4,568,149  2/1986  Sugata et al. ......................... 350/334

OTHER PUBLICATIONS

"LCTV Addressed by MIM Devices", (Kenji et al.), 1984 SID International Symposium Digest of Technical Papers, vol. XV, ISSN 0097-966X, pp. 304-307.

"Promise and Challenge of Thin-Film Silicon Approaches to Active Matrices" (Lakatos), Conference Record of 1982 International Display Research Conference, 82 CH 1790-5, pp. 146-151.

Primary Examiner—Donald A. Griffin
Attorney, Agent, or Firm—Birgit E. Morris; Donald S. Cohen; Henry Steckler

[57] ABSTRACT

An LCD pixel in accordance with the invention has disposed on a substrate a segmented back-to-back diode, an address line, and an electrode adjacent to the address line. The electrode has an additional portion, with one diode segment disposed on the additional portion and the other diode segment disposed on the address line. A free area of the substrate is adjacent to the additional portion so that the diode area is accurately defined.

11 Claims, 6 Drawing Figures

LCD PIXEL INCORPORATING SEGMENTED BACK-TO-BACK DIODE

BACKGROUND OF THE INVENTION

The present invention relates to a liquid crystal display (LCD) using a segmented back-to-back diode.

As known in the art, an LCD comprises a pair of transparent substrates disposed parallel to each other. A first substrate has a plurality of transparent electrodes, which define picture elements (pixels) with address lines disposed therebetween. Address lines, which also serve as the second substrate electrode, are disposed perpendicular to the address lines of the first substrate. Between the two substrates is an aligning layer (such as a polyimide), a liquid crystal, and another aligning layer. When selected address lines on both substrates have the proper voltage applied thereto, the intersection of transparent electrodes of one substrate with respect to that of the other substrate determines which pixel or pixels are turned ON.

U.S. patent application No. 671,315, filed Nov. 8, 1984, under common assignment herewith, discloses a back-to-back diode having a positive and a negative threshold voltage, for use with an LCD such as the LCD shown in U.S. Pat. No. 3,499,702. Each diode is respectively coupled in series with a pixel of the LCD in order to avoid turning ON (or partially turning ON) non-selected pixels when a active multiplexed AC drive voltage is used. Further, concurrently filed application U.S. patent application No. 728,587, filed Apr. 29, 1985, entitled "Simplified Semiconductor Back-to-Back Diode Structure and Method for Making Same", filed in the name of the present inventors, discloses an improved back-to-back diode. In particular, the diode comprises two segments so that the number of mask levels required during fabrications is reduced. This increases the yield and hence reduces the cost.

In an LCD one segment of the improved diode could be disposed on the address line, while the remaining segment could be disposed on the electrode. However due to tolerance variations in forming the diode, the effective diode area could vary causing variations in the diode current versus voltage characteristics.

SUMMARY OF THE INVENTION

A liquid crystal display pixel in accordance with the invention comprises a substrate having an address line and an electrode disposed thereon. The electrode is adjacent to the address line, and has an additional portion and a free area adjacent the additional portion. A segmented diode has one segment disposed on the additional portion and a remaining segment disposed on the address line. The effective diode area is determined by the overlap of diode segments with the electrode additional portion and the address line. The additional portion or address line can each have a pair of segments to enhance reliability.

DETAILED DESCRIPTION OF THE PREFERRED EMBODIMENTS

Figure 1:
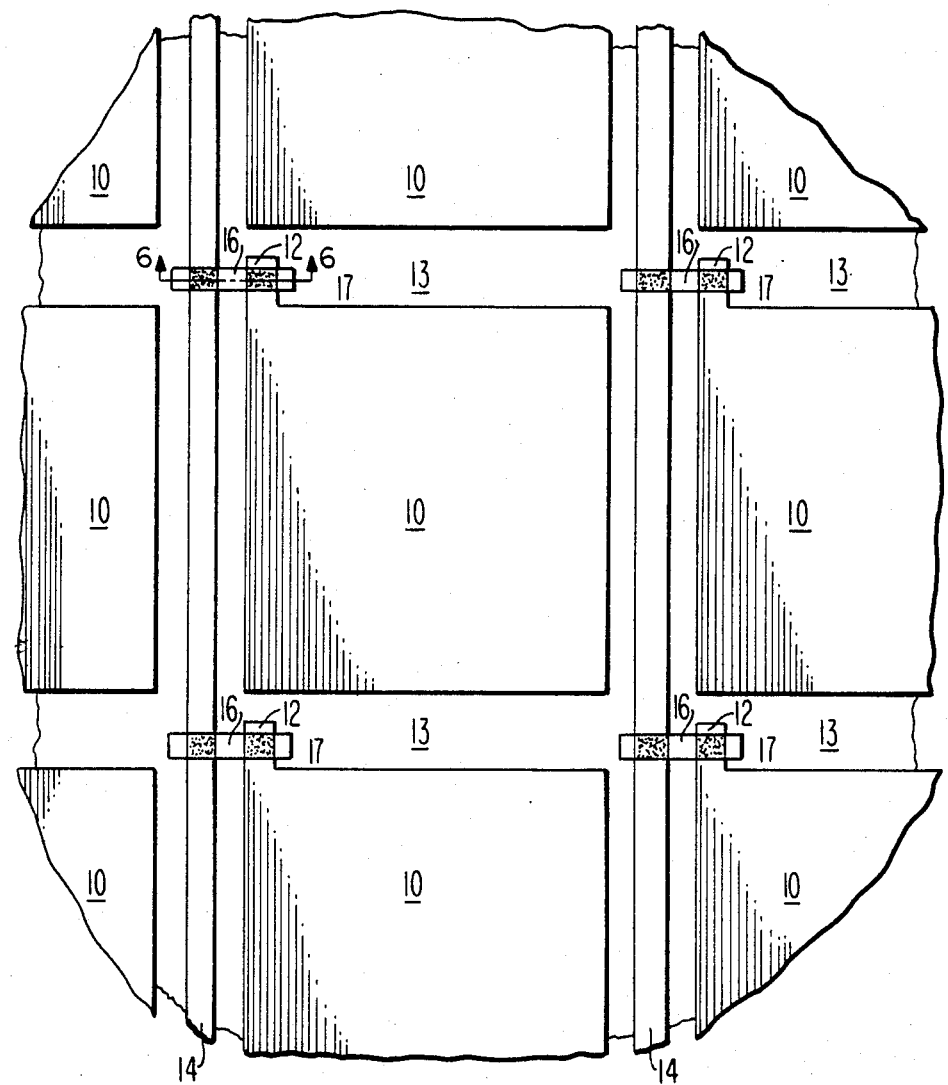
FIG. 1 shows a top view of a portion of a first embodiment of an LCD of the invention.
Figure 6:
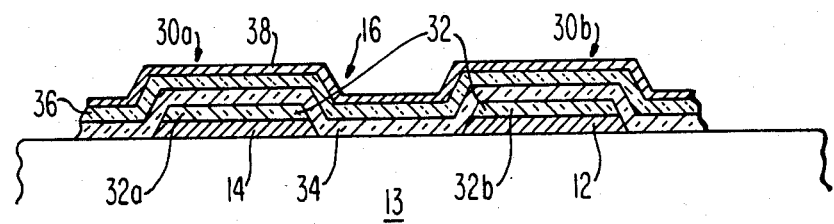
FIG. 6 is a cross-sectional view of a diode taken along line 6—6 of FIG. 1.

FIG. 1 shows a portion of an LCD in accordance with a first embodiment. A plurality of transparent electrodes 10 having additional portions 12 are disposed on a transparent electrically insulating substrate 13. Thus, free areas 17 of the substrate 13 exist adjacent the additional portions 12, which free areas 17 are free of the electrodes 10, i.e. they are uncoated. In the present embodiment, the electrodes may comprise fluorine-doped tin oxide. However, other materials such as indium tin oxide, antimony-doped tin oxide, etc. can be used. Disposed between the electrodes 10 on the substrate 13 are transparent address lines 14 also comprising fluorine-doped tin oxide although other materials including opaque materials, such as chromium, molybdenum, or nickel, can be used. Coupled between the address lines 14 and the additional portions 12 are back-to-back diodes 16, as shown in FIG. 6, which is a cross-sectional view of one of the diodes 16 taken along line 6—6 of FIG. 1. The diode 16 is of segmented construction, i.e. a segment 30a of the diode 16 is disposed on the address line 14 and a segment 30b is disposed on the additional portion 12. The diode 16 is of the PINIP conductivity type, wherein "P" is a positive, "I" is an intrinsic, and "N" is a negative conductivity type layer. Each segment of the diode 16 sequentially comprises P, I and N layers 32, 34, and 36, respectively, with the P layer 32 comprising segments 32a and 32b and the I and N layers 34 and 36 being non-segmented. A conductive layer 38, such as chromium, is disposed over the layer 36 to improve the conductivity between the diode segments 30a and 30b. Further details of the diodes 16 are disclosed in our copending application said U.S. patent application No. 728,587. The widths of an address line 14, the additional portion 12, and the diode 16 determine the effective diode areas as is explained below.

Figure 2:
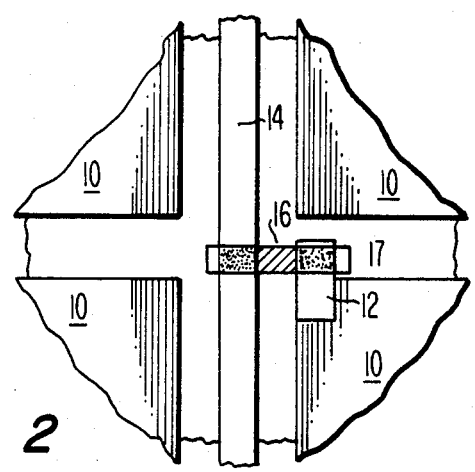
FIG. 2 shows a top view of a portion of a second embodiment of an LCD of the invention.

FIG. 2 shows a second embodiment of an LCD. It differs from that of FIG. 1 in that the address lines 14 and the additional portions 12 comprise a material that differs from the material of the electrode 10. In particular a material, such as chromium, is used to ensure good adherence and thus good ohmic contact to the diode 16.

Figure 3:
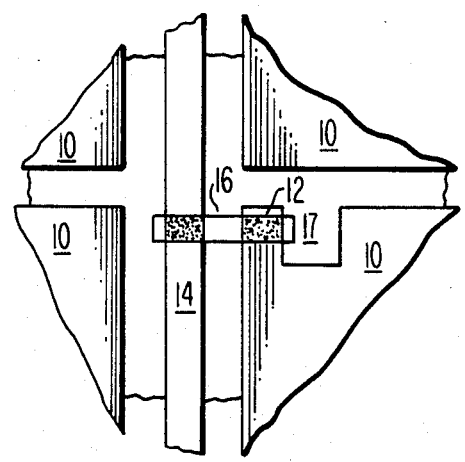
FIG. 3 shows a top view of a portion of a third embodiment of an LCD of the invention.

FIG. 3 shows a third embodiment of an LCD, which differs from that of FIG. 1 in that the electrodes 10 are larger so that the pixel area is larger for a greater fill factor (the percentage of the substrate 13 that is covered by the electrodes 10). It is noted that the free area 17 comprises a notch.

Figure 4:
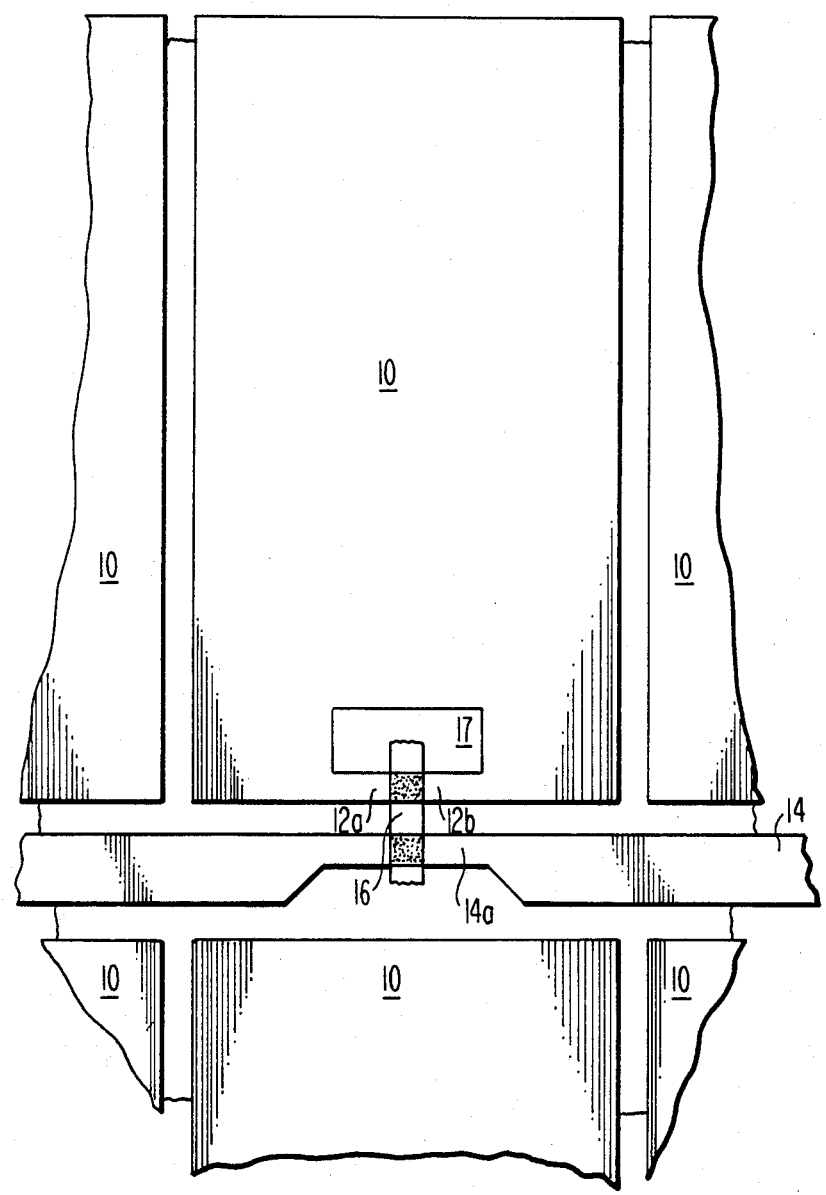
FIG. 4 shows a top view of a portion of a fourth embodiment of an LCD of the invention.

FIG. 4 shows a fourth embodiment of the LCD intended for use as a data display. In such an application a higher resolution is desired in the horizontal (line scan) direction than in the vertical (field scan) direction. Thus the electrodes 10 are rectangular with the narrow dimension in the horizontal direction. Since there are more vertical than horizontal gaps between the electrode 10, the address lines 14 run horizontally to minimize loss in pixel area. The electrodes 10 are formed with the free area 17 comprising a hole and thus two additional portion segments 12a and 12b are shown. The address line 14 has a narrow portion 14a to minimize diode area and hence diode capacitance. In the event one additional portion segment 12a or 12b breaks, the remaining segment will still provide connection to the diode 16.

A problem with the above described fourth embodiment of FIG. 4 is that the narrow portion 14a of the address line 14 is subject to an open circuit, which would turn OFF an entire row of pixels. A fifth embodiment of the LCD shown in FIG. 5 avoids this problem by having an address line additional portion 21 comprising segments 21a and 21a coupled to the address line 14 and defining a hole 19. Thus if either segment 21a or 21b breaks, the remaining segment still makes connection to the diode 16 and the address line 14 is uninterrupted so that the row of pixels is still operational.

Further, if a diode is defective, the pixel can become totally ON (diode shorted) or OFF (diode open). Thus, two parallel diodes 16a and 16b are used. Each of the diodes has one half the width (labeled "x") as that in the other embodiments, e.g. 10μ rather than 20μ. (The length "y" remains the same as the other embodiments, e.g. 20μ).

If a diode 16a or 16b is shorted, it can be burned out with a laser at the areas 23a or 23b respectively. The remaining diode may not have the capability to fully charge the pixel but it will provide partial charging and therefore partial contrast. If a diode is initially open, then the same partial contrast will result from the operation of the remaining diode. In both cases, a random assortment of half lit pixels will be definitely more acceptable than totally ON or OFF pixels. The laser repair can be done after the cell is fabricated.

Figure 5:
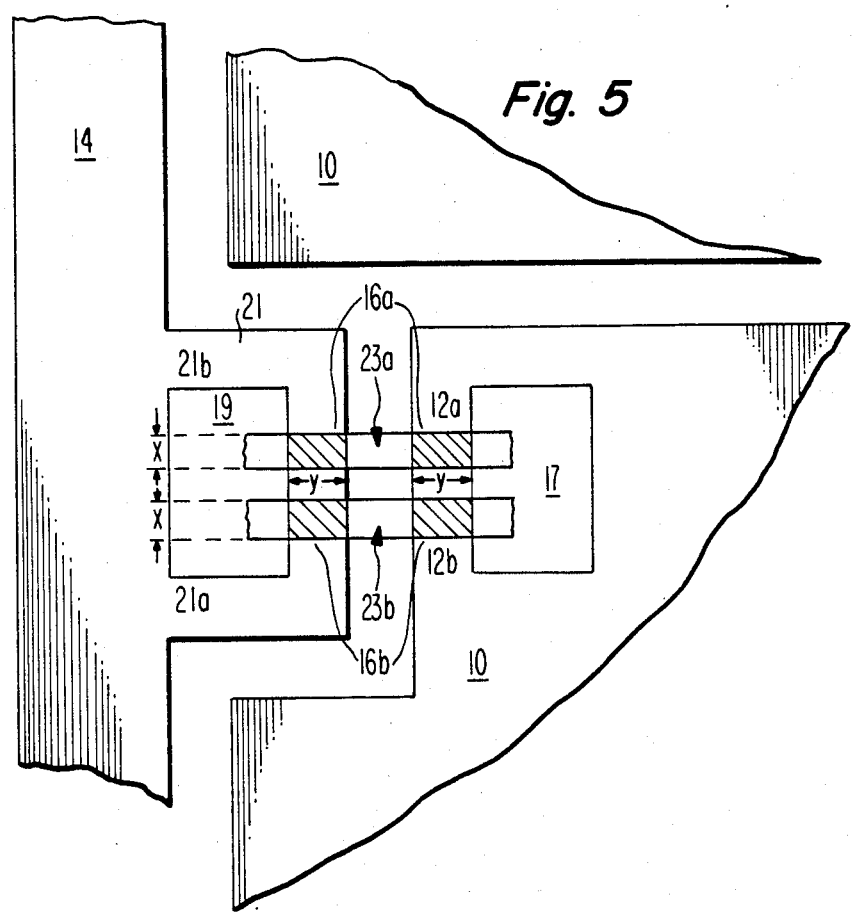
FIG. 5 shows a top view of a portion of a fifth embodiment of an LCD of the invention.

It will be appreciated that in all of the above-described embodiments, the areas of the diode 16 is respectively defined by the overlap of the diode segments with the additional portion 12 and the address line 14 (address line additional portion segments 21 for the embodiment of FIG. 5). The free area 17 allows for misalignment in the horizontal direction (vertical direction for the embodiment of FIG. 4) without a change in the effective diode area. Thus substantially uniform current-voltage characteristics are obtained.

What is claimed is:

1. A liquid crystal display pixel comprising:
   a substrate;
   an address line disposed on said substrate;
   an electrode disposed on said substrate adjacent to said address line and having an additional portion;
   a free area of said substrate being adjacent to said additional portion;
   a first segmented back-to-back diode having a pair of segments respectively disposed on said address line and said additional portion, with the diode area defined by the overlap of one diode segment and said additional portion and the overlap of the remaining diode segment and said address line; and
   wherein said free area comprises a hole in said electrode, and said additional portion comprises two segments adjacent said hole, one of the segments of said segmented diode layer being disposed on both of said additional portion segments.

2. A liquid crystal display pixel as in claim 1, wherein said additional portion and said electrode comprise the same conductive material.

3. A liquid crystal display pixel as in claim 2, wherein said material is fluorine-doped tin oxide.

4. A liquid crystal display pixel as in claim 1, wherein said address line has a narrow portion, the remaining segment of said diode being disposed on said narrow portion.

5. A liquid crystal display pixel as in claim 1, wherein said address line comprises a pair of segments, the remaining segment of said diode being disposed on both of said address line segments.

6. A liquid crystal display pixel as in claim 5, further comprising a second segmented diode having a pair of segments respectively disposed on both of said address line segments and on both of said additional portion segments.

7. A liquid crystal display pixel comprising:
   a substrate;
   an address line disposed on said substrate;
   an electrode disposed on said substrate adjacent to said address line and having an additional portion;
   a free area of said substrate being adjacent to said additional portion;
   a first segmented back-to-back diode having a pair of segments respectively disposed on said address line and said additional portion, with the diode area defined by the overlap of one diode segment and said additional portion and the overlap of the remaining diode segment and said address line; and
   wherein said address line comprises a pair of segments, a segment of said diode being disposed on both of said address line segments.

8. A liquid crystal display pixel as in claim 7, wherein said additional portion and said electrode comprise the same conductive material.

9. A liquid crystal display pixel as in claim 8, wherein said material is fluorine-doped tin oxide.

10. A liquid crystal display pixel comprising:
    a substrate;
    an address line disposed on said substrate;
    an electrode disposed on said substrate adjacent to said address line and having an additional portion, said electrode and said additional portion comprising fluorine doped tin oxide;
    a free area of said substrate being adjacent to said additional portion; and
    a first segmented back-to-back diode having a pair of segments respectively disposed on said address line and said additional portion, with the diode area defined by the overlap of one diode segment and said additional portion and the overlap of the remaining diode segment and said address line.

11. A liquid crystal display pixel comprising:
    a substrate;
    an address line disposed on said substrate;
    an electrode comprising fluorine doped tin oxide disposed on said substrate adjacent to said address line and having an additional portion comprising chrominum;
    a free area of said substrate being adjacent to said additional portion; and
    a first segmented back-to-back diode having a pair of segments respectively disposed on said address line and said additional portion, with the diode area defined by the overlap of one diode segment and said additional portion and the overlap of the remaining diode segment and said address line.

* * * * *